US007108769B1

(12) United States Patent
Constantz

(10) Patent No.: US 7,108,769 B1
(45) Date of Patent: Sep. 19, 2006

(54) SOLAR DISTILLATION LOOP

(75) Inventor: James Edward Constantz, Portola Valley, CA (US)

(73) Assignee: The United States of America as represented by the Secretary of the Interior, Washington, DC (US)

( * ) Notice: Subject to any disclaimer, the term of this patent is extended or adjusted under 35 U.S.C. 154(b) by 272 days.

(21) Appl. No.: 10/729,265

(22) Filed: Dec. 3, 2003

(51) Int. Cl.
*B01D 3/04* (2006.01)
*C02F 1/14* (2006.01)

(52) U.S. Cl. .............. 203/10; 159/904; 159/DIG. 15; 202/188; 202/234; 202/267.1; 203/86; 203/DIG. 1

(58) Field of Classification Search .............. 203/10, 203/86, DIG. 1; 202/188, 234, 267.1; 159/904, 159/DIG. 15
See application file for complete search history.

(56) References Cited

U.S. PATENT DOCUMENTS

| 3,290,230 | A | * | 12/1966 | Kobayashi | .................. 202/234 |
| 4,292,136 | A | * | 9/1981 | Clavier | ....................... 202/234 |
| 4,344,824 | A | | 8/1982 | Soleau, Jr. | ................... 202/234 |
| 4,459,177 | A | * | 7/1984 | O'Hare | ......................... 203/10 |
| 4,504,362 | A | * | 3/1985 | Kruse | .............................. 203/3 |
| 4,698,135 | A | | 10/1987 | Raab | .......................... 202/234 |
| 4,882,071 | A | * | 11/1989 | Bench et al. | ................ 210/747 |
| 5,067,272 | A | | 11/1991 | Constantz | ....................... 47/27 |
| 5,101,593 | A | * | 4/1992 | Bhatt | ............................. 47/17 |
| 5,316,626 | A | * | 5/1994 | Guy | ............................. 203/10 |
| 5,409,578 | A | * | 4/1995 | Kaneko | ........................ 203/10 |
| 5,598,661 | A | | 2/1997 | Eiderman et al. | ............... 47/27 |
| 6,673,213 | B1 | * | 1/2004 | Burgos | ......................... 203/10 |

* cited by examiner

*Primary Examiner*—Virginia Manoharan
(74) *Attorney, Agent, or Firm*—Mark Homer; Joan Gilsdorf

(57) ABSTRACT

A solar distillation loop apparatus includes a first pipe section disposed on a ground surface, the first pipe section including a substantially straight portion and elevated portions on each end of the substantially straight portion, an impure water inflow coupling at one end of the straight portion and an impure water outflow coupling at the other end of the straight portion; solar powered fans disposed in each of the elevated portions of the first pipe section; a second pipe section disposed under the ground surface beneath the first pipe section; and two substantially vertical pipe sections that connect respective ends of the second pipe section to respective ends of the first pipe section.

11 Claims, 3 Drawing Sheets

SOLAR DISTILLATION LOOP

STATEMENT OF GOVERNMENT INTEREST

The invention described herein may be manufactured and used by or for the Government of the United States of America for government purposes without the payment of any royalties therefor.

BACKGROUND OF THE INVENTION

The invention relates in general to the purification of water and in particular to the purification of water using solar energy.

At present, agricultural expansion into many semi-arid and arid regions is severely limited by the scarcity of good quality irrigation water and the cost of the energy necessary to provide irrigation to these areas. Generally, although water resources remain available to these regions, they are mostly unexploited due to two main factors: (1) unacceptable quality of the water for irrigation (e.g., water high in salts or toxins); and (2) the requirement of great conveyance energy (i.e., water transportation, pumping, and pressurizing energy) in order to approach economic usefulness. Due to increased competition for good quality water and higher conveyance costs, the total cost of irrigation is continually increasing in such areas. If this trend continues, not only will agricultural expansion be curtailed, but substantial reductions in irrigated agriculture may be necessary.

Another problem in these dry regions arises with regard to salt accumulation in agricultural basins. For many agricultural basins associated with irrigated areas, irrigation drainage water has become a severe environmental pollutant. This is primarily due to the leachates and tailwaters of the drainage which cause increased salinity of groundwater and surface water resources. Since water imports are limited to their present levels in most of these basins, there have been gradual increases in the proportion of impaired water resources to good quality water resources in these basins.

As a consequence of the situation described above, methods for improving irrigation management, water conservation, and saline water conversion have become increasingly active areas of water resources research. Irrigation management has been improved through more precise irrigation scheduling and increased use of drainage systems. In addition, water conservation techniques such as installation of drip (trickle) irrigation systems and the adoption of drought tolerant crops have helped to maintain the present level of irrigated agriculture in semi-arid and arid regions while leading to reductions in the amount of agricultural drainage. However, when the only water resources available are saline or otherwise impaired, irrigation management and water conservation methods become ineffective, necessitating alternatives such as the use of salt tolerant crops or saline water conversion processes. Although there has been some success with a limited number of salt tolerant crops, water conversion and purification techniques are not being used extensively because of the high costs involved. At present, there are ever increasing amounts of impaired water resources in arid and semi-arid regions that cannot be used for irrigation, and the problem of water distribution in these areas is becoming a very serious one.

In light of these trends, there exists a clear need for a low-energy inexpensive process for water purification and irrigation which is designed to help solve the complex problems associated with water scarcity, increasing water conveyance costs, and regional accumulation of salts. It would be desirable, therefore, to develop an apparatus and process which can cheaply and effectively purify saline or otherwise impaired water resources, and at the same time, distribute the purified water to row crops to allow them to grow in arid and semi-arid regions.

SUMMARY OF THE INVENTION

The present invention is a solar distillation loop apparatus and process. A solar distillation loop is a chemical process that occurs in a drainage pipe system designed to purify salt water, or other impaired water, and distribute the purified water below the surface of the ground at a shallow depth for the purposes of subsurface irrigation or ground-water recharge. Alternatively, a slight variation in the drainage pipe system design redirects the purified water to a storage tank for use as a potable drinking water source.

The invention utilizes sea water, drainage water, sewage effluent, or other impaired water and converts this solution into pure water for use as a source of subsurface irrigation, ground-water recharge or as a source of drinking water. The purification process is a low energy method of water purification, because the water purification process requires solar energy for separation of impurities from the water, as well as the redistribution of the purified water. Solar energy is used as a source of thermal energy to evaporate water from the impaired water solution. Solar energy is also used to generate a direct-current power source to drive fans within the solar distillation loop to distribute the pure water vapor to an appropriate location for condensation and utilization.

The process of solar distillation of impaired water, where water vapor is evaporated from an impaired water body and condensed elsewhere, is carried out within a solar distillation loop. Within a solar distillation loop, the process of solar distillation is greatly accelerated due to: 1) the use of solar-powered fans within the solar distillation loop, and 2) the natural vertical thermal gradient that exists near the ground surface. The circulation created by the solar fans continually reduces the water vapor pressure above the impaired water, which accelerates water evaporation from the impaired water. The natural thermal gradient accelerates the condensation of pure water for the purposes of either subsurface irrigation, ground-water recharge, or a source of potable water.

Embodiments of an apparatus according to the invention may be constructed with existing technology that is user friendly and appealing to farmers. Therefore, the inventive approach to water purification should be more easily accepted than the prior art.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION OF THE PREFERRED EMBODIMENTS

The inventive process takes advantage of the natural thermal gradient at ground surface to purify water through solar distillation. Solar fans force saturated air that would otherwise remain on the surface down to cooler depths, resulting in accelerated evaporation at the surface and accelerated condensation of the water vapor at depth. The drier air that cycles to the surface rapidly evaporates water from the warm water at the surface, and the solar fans again force saturated air down to cooler depths. Thus, the solar fans create a water vapor deficit in the surface section of the loop, and the natural thermal gradient creates a water vapor excess in the buried section of the loop, which in combination greatly accelerate the distillation of purified water beyond the rates of the prior art.

Figure 1:
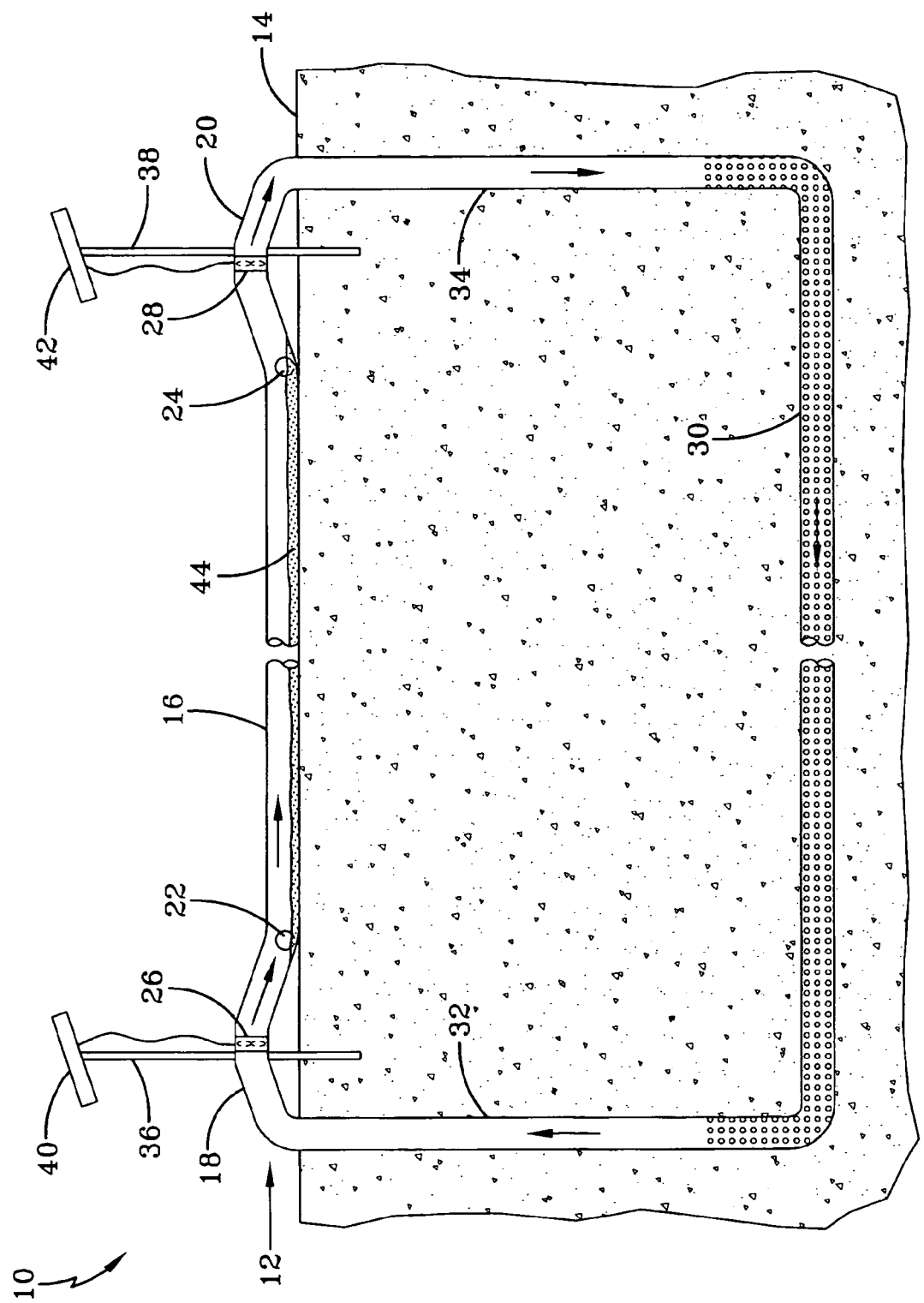
FIG. 1 is a schematic side view of one embodiment of a solar distillation loop according to the invention.

FIG. 1 is a schematic side view of one embodiment of a solar distillation loop 10 according to the invention. Loop 10 comprises a first pipe section 12 disposed on the ground surface 14. The first pipe section 12 includes a substantially straight portion 16 and elevated portions 18, 20 on each end of the substantially straight portion 16. An impure water inflow coupling 22 is located at one end of the straight portion 16 and an impure water outflow coupling 24 is located at the other end of the straight portion. Solar powered fans 26, 28 are disposed in each of the elevated portions 18, 20 of the first pipe section 12.

A second pipe section 30 is disposed under the ground surface 14 beneath the first pipe section 12. Two substantially vertical pipe sections 32, 34 connect respective ends of the second pipe section 30 to respective ends of the first pipe section 12. The first pipe section 12, second pipe section 30 and the two substantially vertical pipe sections 32, 34 may be conventional drainage pipe, made of, for example, ABS plastic or PVC. Pipe sections 12, 30, 32, 34 form a closed loop of pipe with first pipe section 12 residing on the soil surface 14 and second pipe section 30 buried below the ground surface 14. In the embodiment of FIG. 1, second pipe section 30 is perforated and buried at a depth of about 1 to about 3 meters below the ground surface 14 in an agricultural field or similar setting. As shown in FIG. 1, the lower portions of the two vertical pipe sections 32, 34 may also be perforated.

Buried second pipe section 30 may be any length, but a practical length is at least 100 meters. Above-ground first pipe section 12 has substantially the same length as buried second pipe section 30. Buried second pipe section 30 is connected to first pipe section 12 by vertical pipe sections 32, 34 that emerge at ground surface 14 on either end of the agricultural field or similar setting. Both ends of first pipe section 12 include elevated portions 18, 20 each containing a solar powered fan 26, 28. Elevated portions 18, 20 may be supported by attachment to posts 36, 38. Preferably, the distance between the bottom of elevated portions 18, 20 and the ground surface 14 is about one pipe diameter. Posts 36, 38 also support solar panels 40, 42 that provide DC power to the solar powered fans 26, 28.

Solar powered fans 26, 28 are oriented in the solar distillation loop 10 to force air in a circular fashion through the loop 10 during daylight hours. Fan 26 forces air along the first pipe section 12 and fan 28 forces air down vertical pipe section 34 into the buried second pipe section 30. In the straight portion 16 of the above-ground first pipe section 12, a shallow layer of impaired or impure water 44 flows into the straight portion 16 at one end via impure water inflow coupling 22. Impure water is removed from the other end of the straight portion 16 via impure water outflow coupling 24. In the manner of an irrigated field, the ground surface 14 has a slight slope from inflow coupling 22 to outflow coupling 24. Depending on the topography of the land, pumps may be used to supply the inflow water and/or remove the outflow water.

During the day, the air space in the straight portion 16 of the first pipe section 12 rapidly reaches water-vapor saturation. The solar powered fans 26, 28 quickly force this water vapor below ground into second pipe section 30. The saturated air is quickly cooled at depth in the buried second pipe section 30, causing water vapor to condense either in the second pipe section 30 or immediately outside it. Meanwhile, the impure water in the straight portion 16 is replenished and/or removed as needed by the inflow and outflow couplings 22, 24 connected to inflow and outflow pipes (not shown). The inflow and outflow pipes are either connected to additional parallel loops 10, or the inflow and outflow pipes are connected to inflow and outflow laterals in a similar fashion to irrigated agricultural fields.

Figure 3A:
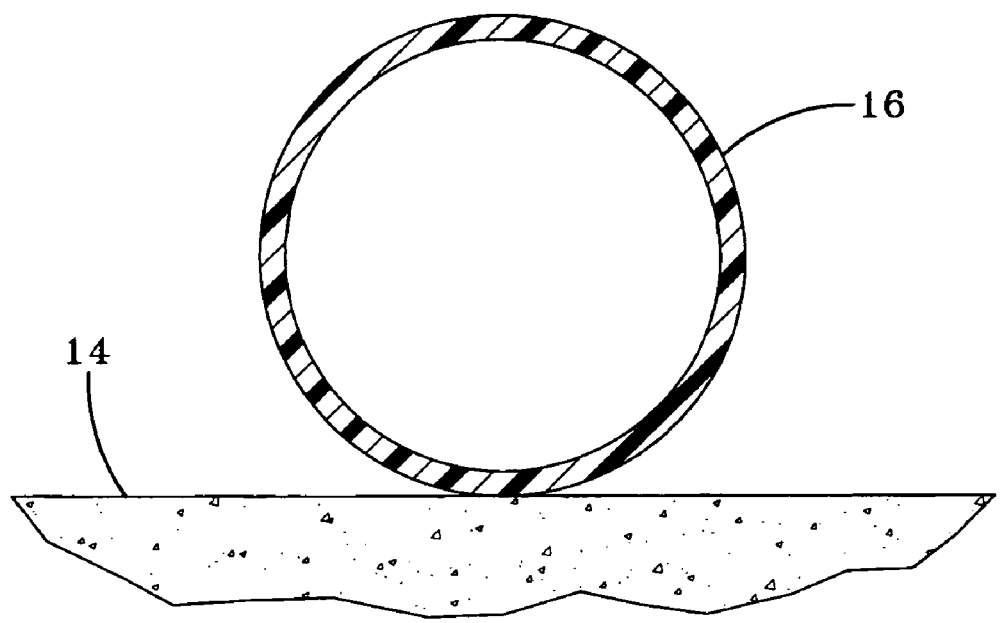
FIGS. 3A and 3B are schematic cross-sections of a portion of the solar distillation loop.
Figure 3B:
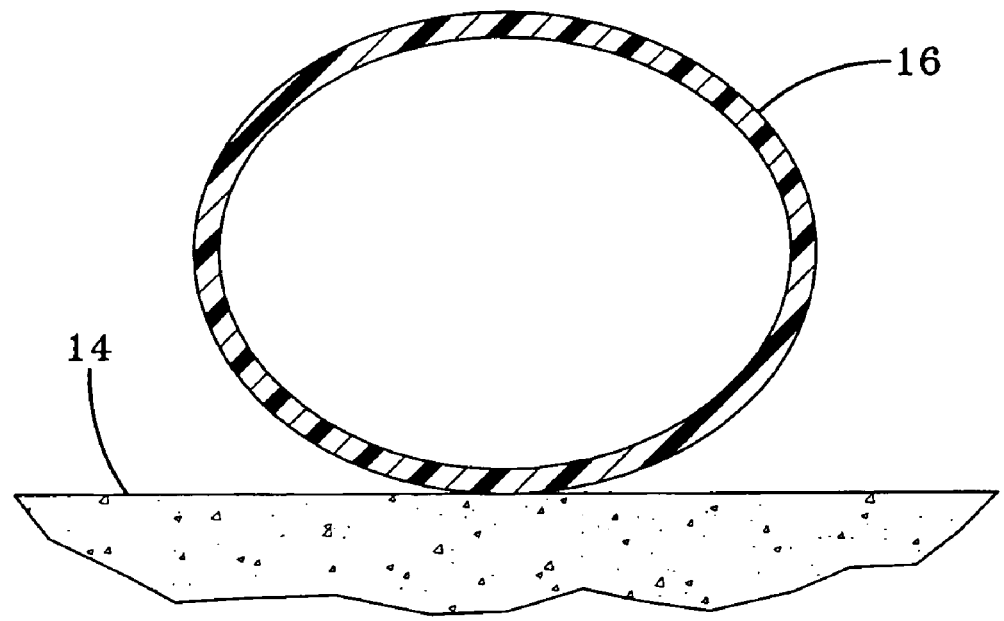

Note that the diameter of the straight portion 16 and the second pipe section 30 need not be the same. The diameter of the straight portion 16 may be greater (for example) than the diameter of the second pipe section 30. FIG. 3A shows the straight portion 16 having a circular cross-section. The cross-section of the first pipe section 12, second pipe section 30 and vertical pipe sections 32, 34 may be, for example, circular. The diameter of the pipe sections needs to be large enough to carry both liquid and gas without undue resistance to flow of either fluid and sufficiently large to allow for ground surface elevation variations. A minimum diameter is about four inches. The pipe cross-section may also have other shapes, such as elliptical. FIG. 3B shows the straight portion 16 having an elliptical cross-section. In the elliptical cross-section, the major axis is oriented parallel to the ground surface. The elliptical cross-section increases the surface area of water in the pipe, thereby increasing the evaporation rate per unit length. However, because the ground surface is nearly flat, the horizontal diameter (major axis) should not be more than twice the vertical diameter (minor axis).

The color of the above-ground first pipe section 12 is preferably black, to maximize heat absorption from the sun. Furthermore, the straight portion 16 of the above-ground first pipe section 12 does not necessarily need to be constructed of rigid pipe, but could be constructed of non-rigid tubing designed to inflate when the fans 26, 28 are in operation.

Depending on need, one field might contain hundreds of loops 10 connected via inflow and outflow pipes and inflow and outflow laterals to convey water onto and away from the field. As darkness approaches the fans 26, 28 automatically stop, and the ground surface 14 cools below the temperature at depth. During the night, the heat of condensation that has been absorbed in the soil/sediments at depth is dissipated radially away from the underground second pipe section 30. At sunrise, the ground surface 14 begins to heat and the fans 26, 28 automatically start cycling water vapor below ground to be condensed. The invention results in an extremely accelerated solar distillation process which creates a source of pure water and then distributes this water for the purposes of subsurface irrigation or ground-water recharge.

Figure 2:
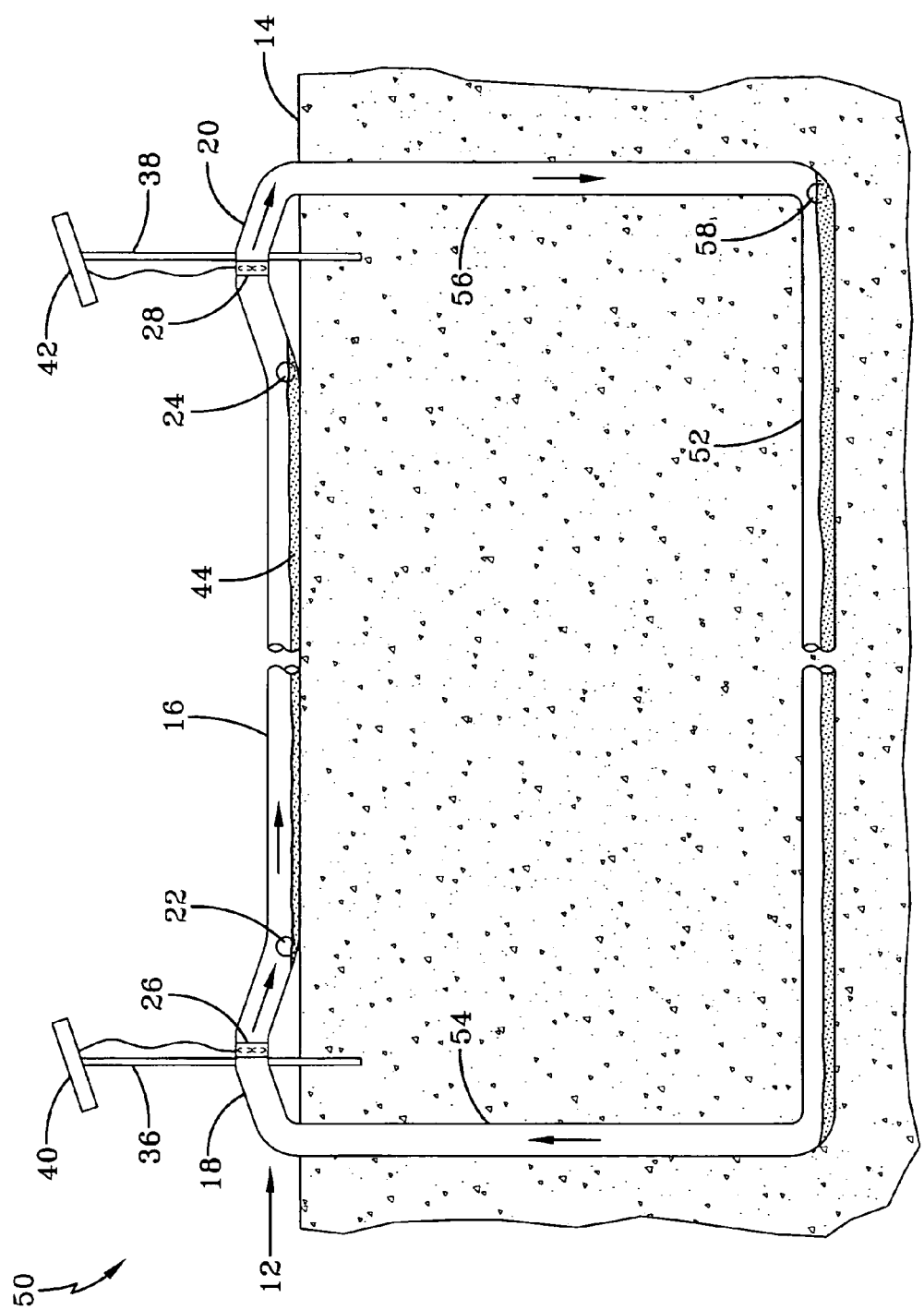
FIG. 2 is a schematic side view of another embodiment of a solar distillation loop.

FIG. 2 is a schematic side view of another embodiment of a solar distillation loop 50 according to the invention. In FIG. 2, the solar distillation loop 10 of FIG. 1 is slightly modified to provide a source of drinking water rather than irrigation or recharge water. In the embodiment of FIG. 2, no perforated pipe is used in the loop 50 (i.e., both the above ground and buried sections of the loop are non-perforated). Thus, in FIG. 2, second pipe section 52 and the two substantially vertical pipe sections 54, 56 are non-perforated. Second pipe section 52 also includes a pure water outflow connection 58. The condensed water trapped in second pipe section 52 is routed via pure water outflow connection 58 to a buried lateral pipe (not shown) for conveyance to a potable water storage tank. Thus, in the embodiment of FIG. 2, purified water is routed to storage rather than entering the soil or sediment surrounding the buried section of the loop. In other respects, the embodiment of FIG. 2 operates like the embodiment of FIG. 1.

The advantages of the inventive solar distillation loop over solar distillation drip irrigation include less cost, greater durability, easier operation, higher user confidence, and the ability to generate drinking water. The solar fans 26, 28 are self-regulating such that when increased solar inputs cause increased potential for evaporation in the first pipe section 12, this increased input also increases the rate of circulation due to solar-induced increases in the DC power input to the fans 26, 28. Additionally, because most of the solar distillation loop comprises drainage pipe commonly used in agricultural settings, end users should have a reasonable comfort level with the invention. Historically, introducing new concepts has been an issue with the farming and water purveyor communities.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A solar distillation loop apparatus, comprising:
   an evaporation section comprising a first pipe section disposed on a ground surface, the first pipe section including a substantially straight portion and elevated portions on each end of the substantially straight portion, an impure water inflow coupling at one end of the straight portion, and an impure water outflow coupling at the other end of the straight portion, wherein solar energy heats the substantially straight portion to evaporate impure water therein;
   solar powered fans disposed in each of the elevated portions of the first pipe section; and
   a condensation section comprising a second pipe section and two substantially vertical pipe sections, the second pipe section being disposed under the ground surface beneath the first pipe section, and the two substantially vertical pipe sections connecting respective ends of the second pipe section to respective ends of the first pipe section,
   wherein the second pipe section is disposed under the ground surface at a depth of about one to about three meters.

2. A solar distillation loop apparatus, comprising:
   an evaporation section comprising a first pipe section disposed on a ground surface, the first pipe section including a substantially straight portion and elevated portions on each end of the substantially straight portion, an impure water inflow coupling at one end of the straight portion, and an impure water outflow coupling at the other end of the straight portion, wherein solar energy heats the substantially straight portion to evaporate impure water therein;
   solar powered fans disposed in each of the elevated portions of the first pipe section; and
   a condensation section comprising a second pipe section and two substantially vertical pipe sections, the second pipe section being disposed under the around surface beneath the first pipe section, and the two substantially vertical pipe sections connecting respective ends of the second pipe section to respective ends of the first pipe section,
   wherein the second pipe section is perforated and lower portions of the two substantially vertical pipe sections are perforated.

3. The apparatus of claim 2, wherein a color of the substantially straight portion of the first pipe section is black.

4. The apparatus of claim 1 wherein a cross-section of the substantially straight portion of the first pipe section is circular.

5. The apparatus of claim 2 wherein a cross-section of the substantially straight portion of the first pipe section is substantially elliptical, with a major axis of the cross-section generally parallel to the ground surface.

6. The apparatus of claim 2, wherein a material of the first pipe section, the second pipe sections and the two substantially vertical pipe sections comprises acrylonitrile butadiene styrene (ABS) plastic.

7. The apparatus of claim 2, wherein a material of the first pipe section, the second pipe section, and the two substantially vertical pipe sections comprises polyvinyl chloride (PVC).

8. The apparatus of claim 2 further comprising solar panels connected to each of the solar powered fans.

9. A method of producing distilled water using a solar distillation loop, comprising:
   disposing a first pipe section on a around surface, the first pipe section including a substantially straight portion and elevated portions on each end of the substantially straight portion, an impure water inflow coupling at one end of the straight portion, and an impure water outflow coupling at the other end of the straight portion;
   disposing solar powered fans in each of the elevated portions of the first pipe section;
   disposing a second pipe section under the ground surface beneath the first pipe section;
   installing two substantially vertical pipe sections connecting respective ends of the second pipe section to respective ends of the first pipe section;
   providing impure water to the first pipe section via the impure water inflow coupling and removing impure water from the first pipe section via the impure water outflow coupling;
   evaporating water from the impure water in the substantially straight portion of the first pipe section by solar energy heating the substantially straight portion;
   using the solar powered fans, moving the evaporated water from the first pipe section to the second pipe section; and
   condensing the evaporated water in the second pipe section.

10. The method of claim 9 wherein the second pipe section is perforated, the method further comprising absorbing the condensed water in soil surrounding the second pipe section.

11. The method of claim 9, wherein the second pipe section comprises an outflow connection, the method further comprising removing the condensed water from the second pipe section via the outflow connection.

* * * * *